United States Patent [19]

Wernberg

[11] Patent Number: 4,458,713
[45] Date of Patent: Jul. 10, 1984

[54] BYPASS-TYPE DIFFERENTIAL PRESSURE REGULATOR

[75] Inventor: Donald E. Wernberg, Rockford, Ill.

[73] Assignee: Woodward Governor Company, Rockford, Ill.

[21] Appl. No.: 446,659

[22] Filed: Dec. 3, 1982

[51] Int. Cl.³ .............................................. G05D 7/01
[52] U.S. Cl. .............................. 137/117; 137/484.2; 137/484.4
[58] Field of Search ................. 137/117, 484.2, 484.4, 137/584.6, 584.8, 494, 504

[56] References Cited

U.S. PATENT DOCUMENTS

| 2,957,488 | 10/1960 | Farkas | 137/117 |
| 3,140,722 | 7/1964 | Gordon | 137/103 |
| 3,217,732 | 11/1965 | Haugeland | 137/117 |
| 3,322,134 | 5/1967 | Enemark | 137/103 |
| 3,465,778 | 9/1969 | Kast | 137/117 |
| 3,723,025 | 3/1973 | Coakley | 417/299 |
| 4,117,857 | 10/1978 | Van De Mark | 137/117 |

Primary Examiner—Robert G. Nilson
Attorney, Agent, or Firm—Leydig, Voit, Osann, Mayer & Holt, Ltd.

[57] ABSTRACT

The pressure regulator includes a valve member which is supported to slide back and forth in a valve housing having a high pressure port, a low pressure port and a bypass port. Pressure fluid from the high pressure port is bypassed through the valve member via an orifice, a passage and a metering opening formed in the valve member, the passage communicating with a compensating chamber located between the valve member and the valve housing. As the bypass flow increases, the increased pressure drop across the orifice reduces the pressure in the chamber to compensate for the progressive resistance imposed upon the valve member by a bias spring and by increasing fluid reaction forces. The compensating chamber enables the regulator to maintain a more substantially constant pressure drop across the high and low pressure ports of the regulator at various bypass flow rates.

7 Claims, 1 Drawing Figure

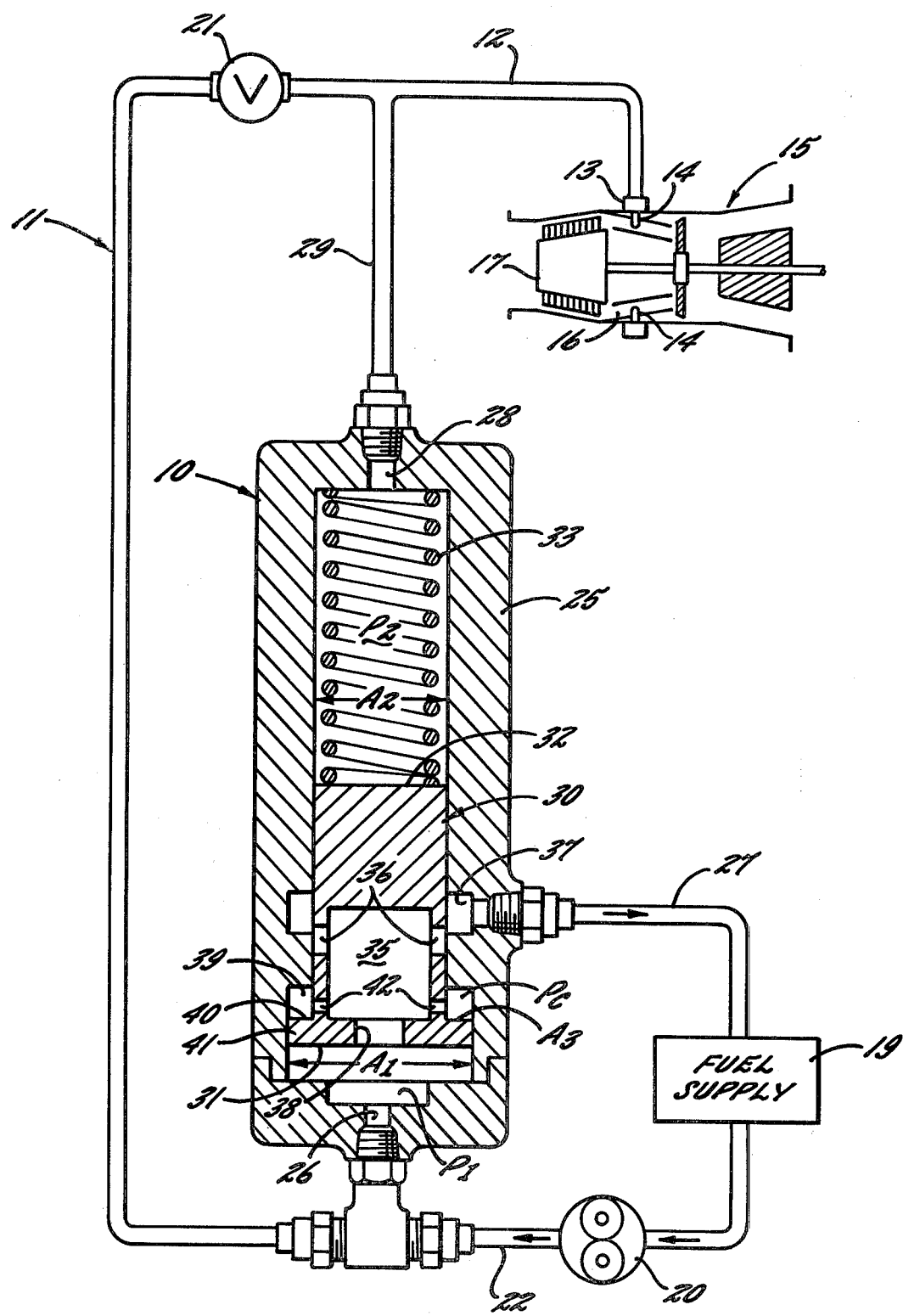

BYPASS-TYPE DIFFERENTIAL PRESSURE REGULATOR

BACKGROUND OF THE INVENTION

This invention relates generally to a pressure regulator and more particularly to a bypass-type differential pressure regulator for maintaining a substantially constant pressure drop across the high and low pressure sides of a fluid pressure system having a high pressure bypass line. Such a regulator may, for example, be used to maintain a constant pressure drop across the inlet and outlet of a metering valve which forms part of the fluid pressure system.

A typical bypass-type differential pressure regulator comprises a piston-like valve member which is adapted to move back and forth in a valve housing having high and low pressure ports communicating with the high and low pressure sides of the system. The valve housing also includes a bypass port for bypassing pressure fluid from the high pressure side of the system to the bypass line. High pressure fluid admitted into the housing biases the valve member to a position tending to open the bypass port while a spring coacts with low pressure fluid admitted into the housing to bias the valve member to a position tending to close the bypass port. If the high pressure increases or the low pressure decreases, the valve member is shifted to bypass more flow from the high pressure side of the system to the bypass line and thereby maintain a substantially constant pressure drop across the high and low pressure sides of the system. Conversely, a decrease in the high pressure or an increase in the low pressure results in the valve member being shifted to bypass less flow and thus maintain the substantially constant pressure drop. A bypass-type differential pressure regulator of this general type is disclosed in Van De Mark U.S. Pat. No. 4,117,857.

Difficulty has been encountered with prior regulators in maintaining a constant pressure drop at various flows and particularly when there is a wide range of bypass flows. As the bypass flow increases and the valve member opens, the biasing force exerted by the spring becomes progressively higher and thus the valve member encounters progressively greater resistance against movement to an open position. Also, increasing fluid reaction forces resist opening of the valve member. As a result, the pressure drop across the system tends to increase at high bypass flow rates rather than remaining at a desired constant value.

SUMMARY OF THE INVENTION

The general aim of the present invention is to provide a new improved pressure regulator, and specifically a bypasstype differential pressure regulator, which is capable of maintaining a more uniform pressue drop across a fluid pressure system having widely varying bypass flow rates.

A more detailed object of the invention is to achieve the foregoing by providing a bypass-type differential pressure regulator which uniquely senses the bypass flow and, as the bypass flow rate increases, automatically reduces the pressure tending to close the valve member so that the valve member may open further and bypass more flow. By automatically reducing the closing pressure on the valve member as the bypass flow increases, the regulator compensates for the progressively higher resistance of the bias spring and the fluid reaction forces and is capable of maintaining a more constant pressure drop at various bypass flow rates.

The invention also resides in the novel construction of the valve housing and the valve member to effect a decrease in the closing pressure on the valve member as the bypass flow increases.

These and other objects and advantages of the invention will become more apparent from the following detailed description when taken in conjunction with the accompanying drawing.

BRIEF DESCRIPTION OF THE DRAWING

The single FIGURE of the drawing is a schematic view showing a typical fluid pressure system having a new and improved bypass-type differential pressure regulator incorporating the unique features of the present invention.

DETAILED DESCRIPTION OF THE PREFERRED EMBODIMENT

For purposes of illustration, the bypass-type differential pressure regulator 10 of the present invention is schematically shown in the drawing as being incorporated in a fluid pressure system 11 for delivering pressurized liquid fuel to a line 12 leading to the manifold 13 for the burner nozzles 14 of a gas turbine engine 15 having a combustion chamber 16 and adapted to drive a rotary compressor 17. Fuel for the engine is contained in a tank 19 and is pressurized and delivered to the engine by a positive displacement gear pump 20 which may be driven by the engine. The fuel is supplied to the line 12 at a regulated rate by way of a servo-controlled metering valve 21 which communicates with the high pressure side of the pump via a high pressure supply line 22.

In order to supply fuel to the line 12 at a regulated rate, it is desirable to maintain a substantially constant pressure drop across the high and low pressure sides of the metering valve 21 regardless of the flow rate through the valve. For this purpose, the differential pressure regulator 10 is incorporated into the system 11. Herein, the regulator 10 comprises a valve housing 25 having a high pressure port 26 which communicates directly with the high pressure line 22 and which is adapted to communicate with a high pressure bypass line 27 leading from the regulator to the fuel tank 19. Located at the end of the housing 25 opposite the high pressure port 26 is a low pressure port 28 which, by way of line 29, communicates with the line 12 at a point on the outlet or low pressure side of the metering valve 21 so that the port 28 is subjected to the low pressure of the system 11.

Slidable back and forth within the valve housing 25 is a piston-like valve member 30. Pressure fluid admitted into the high pressure port 26 of the housing acts against a pressure face or piston face 31 on the lower end of the valve member and tends to shift the valve member upwardly to a position allowing a bypass flow of pressure fluid from the high pressure line 22, through the high pressure port 26 and then to the bypass line 27 and the tank 19. Conversely, pressure fluid admitted into the low pressure port 28 of the housing 25 acts against a pressure face or piston face 32 on the upper end of the valve member 30 and tends to shift the valve member downwardly so as to reduce the bypass flow from the high pressure line 22 to the bypass line 27. A coil spring 33 is compressed between the upper end of the housing and the piston face 32 of the valve member and also acts to shift the valve member downwardly.

With the foregoing arrangement, the valve member 30 is shifted upwardly whenever the pressure $P_1$ in the high pressure line 22 increases or whenever the pressure $P_2$ in the low pressure line 29 decreases. Such upward shifting increases the bypass flow from the high pressure line 22 to the bypass line 27 so as to reduce the pressure $P_1$ in the high pressure line and maintain a substantially constant pressure drop $P_1 - P_2$ across the metering valve 21. If the pressure $P_1$ in the high pressure line 22 decreases or if the pressure $P_2$ in the low pressure line 29 increases, the valve member 30 shifts downwardly to reduce the bypass flow from the high pressure line 22 to the bypass line 27 and thereby increase the pressure $P_1$ so as to maintain the pressure drop $P_1 - P_2$ at substantially the same constant value.

As the valve member 30 progressively shifts upwardly, the force applied to the valve member by the biasing spring 33 becomes progressively greater as the compression in the spring increases. Thus, the spring progressively resists upward movement of the valve member to the bypass position as the bypass flow increases. In addition, fluid reaction forces increase as the bypass flow increases, and such reaction forces also progressively resist upward movement of the valve member to the bypass position. Under such circumstances and as the bypass flow increases, the valve member tends to bypass less flow than is necessary to maintain the pressure drop $P_1 - P_2$ at a constant value and thus the pressure drop $P_1 - P_2$ tends to increase.

In accordance with the present invention, the pressure regulator 10 is uniquely constructed to sense the bypass flow and, as the flow increases, to compensate for the progressive resistance exerted by the spring and the reaction forces and to effect movement of the valve member to a more open position than normal and thereby bypass more flow. As a result, the pressure drop $P_1 - P_2$, instead of increasing as the flow increases, tends to remain at a more substantially constant value at widely varying flow rates.

More specifically, the valve member 30 is formed with a passage 35 which is located between the piston faces 31 and 32 of the valve member. Formed radially through the valve member and communicating with the passage 35 is at least one metering port 36, the preferred valve member being formed with a plurality of angularly spaced metering ports. The metering ports 36 are adapted to communicate with an annular bypass port 37 which is formed in the valve housing 25 and which communicates with the bypass line 27. As the valve member 30 shifts upwardly from the bypass position shown in the drawing, the metering ports 36 progressively open the bypass port 37. Conversely, downward movement of the valve member from the position shown in the drawing moves the metering ports out of registering relation with the bypass port and causes the valve member to close off the bypass port.

An opening or orifice 38 is formed through the center of the piston face 31 and establishes communication between the high pressure port 26 and the passage 35. Pressure fluid is bypassed by the regulator 10 by virtue of the pressure fluid flowing into the high pressure port 26, through the orifice 38 and the passage 35 and then out of the metering ports 36 and the bypass port 37 to the bypass line 27. The cross-sectional area of the orifice 38 is less than the cross-sectional area of the passage 35 so that the pressure fluid undergoes a pressure drop upon flowing through the orifice from the high pressure port 26 to the passage 35.

In carrying out the invention, an annular pressure chamber 39 is formed between the valve housing 25 and the valve member 30. One side of the chamber 39 is defined by one side 40 of a radially projecting land 41 formed around the lower end of the valve member 30, the other side of the land forming part of the piston face 31. At least one opening 42 is formed radially through the valve member 30 and establishes communication between the passage 35 and the chamber 39. There preferably are several angularly spaced openings 42 formed through the valve member.

With the foregoing arrangement, the pressure $P_1$ admitted into the high pressure port 26 of the valve housing 25 acts against an effective area $A_1$ defined by the area embraced by the outer periphery of the land 41 and formed in part by the piston face 31. Thus, a force $P_1 A_1$ tends to shift the valve member 30 upwardly. Upward movement of the valve member is resisted by the pressure $P_2$ admitted into the low pressure port 28 and acting against an area $A_2$ defined by the piston face 32 of the valve member. Accordingly, a force $P_2 A_2$ tends to urge the valve member downwardly. That force is augmented by the force $F_s$ of the spring 33 and by the net reaction force $F_r$ of the fluid pressure. In keeping with the invention, a further downward force is exerted on the valve member by virtue of the high pressure being transmitted from the passage 35 to the chamber 39 by way of the openings 42 and acting as a pressure $P_c$ against the upper side 40 of the land 41. The area of the upper side 40 of the land 41 has been designated $A_3$ and, pursuant to the invention, the area $A_3$ is equal to the high pressure area $A_1$ minus the low pressure area $A_2$.

Accordingly, the upward force acting on the valve member 30 and tending to open the bypass port 37 is $P_1 A_1$ while the combined downward force acting on the valve member and tending to close the bypass port is $P_2 A_2 + P_c A_3 + F_s + F_r$. Thus, the force balance on the valve member may be expressed substantially as $$P_1 A_1 = P_2 A_2 + P_c A_3 + F_s + F_r \tag{1}$$

When the valve member 30 is in a steady state position and there is no flow through the bypass port 37, the pressure $P_c$ in the chamber 39 is equal to the high pressure $P_1$, the net reaction force $F_r$ is zero and thus the force balance equation is:

$$P_1 A_1 = P_2 A_2 + P_1 A_3 + F_s \tag{2}$$

And, since the area $A_3$ is equal to the area $A_1$ minus the area $A_2$, equation (2) may be rewritten as:

$$P_1 A_1 = P_2 A_2 + P_1(A_1 - A_2) + F_s \tag{3}$$

And, equation (3) may be simplified and rewritten as:

$$P_1 - P_2 = k \tag{4}$$

where k is a constant.

Thus, the position of the valve member 30 changes as a function of changes in the pressure drop $P_1 - P_2$ and, assuming that the spring force $F_s$ and the reaction force $F_r$ remain constant throughout the entire range of travel of the valve member, the distance through which the valve member moves varies as a linear function of changes in the pressure drop.

But, as stated above, the forces $F_s$ and $F_r$ do not remain constant but instead increase as the bypass flow increases and as the valve member 30 shifts upwardly. The pressure regulator 10 of the invention, however, compensates for the increase in the forces $F_s$ and $F_r$. As the valve member shift upwardly to permit bypass flow through the metering ports 36 and the bypass port 37, the pressure drop resulting from flow through the orifice 38 reduces the pressure $P_c$ transmitted to the chamber 40. Referring to equation (1) above, it will be seen that a reduction in the pressure $P_c$ reduces the total downward force acting on the valve member and compensates for the increased downward forces $F_s$ and $F_r$. As the bypass flow increases, the pressure $P_c$ becomes progressively less so as to offset the progressively increasing forces $F_s$ and $F_r$.

Accordingly, the pressure regulator 10 of the invention allows the valve member 30 to move to a more open position than would be the case in the absence of the compensating pressure $P_c$. Thus, the pressure drop $P_1 - P_2$ tends to remain at a more substantially constant value rather than progressively increasing as the bypass flow increases and as the spring 33 and the fluid reaction forces progressively resist upward movement of the valve member. As a result, the operation of the regulator is more precise over a wide range of bypass flow rates. By correlating the areas of the orifice 38, the metering ports 36 and the openings 42 with one another and with the spring 33, the operation of the regulator may be optimized for each specific application. The regulator also may be used to maintain a substantially constant pressure in fluid pressure systems other than the specific system 11 shown in the drawing.

I claim:

1. A bypass-type differential pressure regulator for maintaining a substantially constant pressure drop across the high and low pressure sides of a fluid pressure system having a high pressure bypass line, said regulator comprising a valve housing having (a) a high pressure port adapted to communicate with the high pressure side of said system, (b) a low pressure port adapted to communicate with the low pressure side of said system and (c) a bypass port adapted to communicate with the bypass line of said system, a valve member movable back and forth in said housing toward and away from a bypass position, said valve member having a first pressure face means against which the pressure admitted into said high pressure port acts to move said valve member toward said bypass position, said valve member having an oppositely facing second pressure face means against which the pressure admitted into said low pressure port acts to move said valve member away from said bypass position, and resiliently yieldable means acting on said valve member and biasing said valve member away from said bypass position, the improvement in said pressure regulator comprising, a passage formed in said valve member, an orifice formed in said valve member and establishing communication between said passage and said high pressure port, a metering port formed through said valve member and establishing communication between said passage and said bypass port when said valve member is in said bypass position, said metering port permitting a bypass flow from said high pressure port to said bypass port by way of said orifice and said passage when said valve member is in said bypass position and reducing the bypass flow as said valve member is moved away from said bypass position, a chamber defined between said valve member and said housing and having one side formed by a third pressure face means located on said valve member and facing in the same direction as said second pressure face means, and an opening in said valve member and establishing communication between said passage and said chamber whereby the pressure in said passage is transmitted to said chamber and acts against said third pressure face means to assist in moving said valve member away from said bypass position and whereby an increase in the bypass flow through said orifice and said passage reduces the pressure in said chamber to allow said valve member to move further toward said bypass position.

2. A differential pressure regulator as defined in claim 1 in which said valve member includes a land, said first and third pressure face means being defined at least in part by opposite sides of said land.

3. A differential pressure regulator as defined in claim 1 in which the combined effective area of said second and third pressure face means is equal to the effective area of said first pressure face means.

4. A differential pressure regulator as defined in claim 2 in which the combined effective area of said second and third pressure face means is equal to the effective area of said first pressure face means.

5. A differential pressure regulator as defined in claim 1 in which said orifice extends axially of said valve member, said metering port and said opening extending radially of said valve member.

6. A differential pressure regulator as defined in claim 1 in which the cross-sectional area of said orifice is less than the cross-sectional area of said passage.

7. A bypass-type pressure regulator for maintaining a substantially constant pressure in a fluid pressure system having a high pressure supply line and a high pressure bypass line, said regulator comprising a valve housing having a high pressure port and a bypass port adapted to communicate with the high pressure line and the bypass line, respectively, of said system, a valve member movable back and forth in said housing toward and away from a bypass position, said valve member having a first pressure face means against which the pressure admitted into said high pressure port acts to move said valve member toward said bypass position, and resiliently yieldable means acting on said valve member and biasing said valve member away from said bypass position, the improvement in said pressure regulator comprising, a passage formed in said valve member, an orifice formed in said valve member and establishing communication between said passage and said high pressure port, a metering port formed through said valve member and establishing communication between said passage and said bypass port when said valve member is in said bypass position, said metering port permitting a bypass flow from said high pressure port to said bypass port by way of said orifice and said passage when said valve member is in said bypass position and reducing the bypass flow as said valve member is moved away from said bypass position, a chamber defined between said valve member and said housing and having one side formed by a second pressure face means located on said valve member and facing opposite of said first pressure face means, and an opening in said valve member and establishing communication between said passage and said chamber whereby the pressure in said passage is transmitted to said chamber and acts against said second pressure face means to assist in moving said valve member away from said bypass position and whereby an increase in the bypass flow through said orifice and said passage reduces the pressure in said chamber to allow said valve member to move further toward said bypass position.

* * * * *